(12) United States Patent
Davis

(10) Patent No.: US 8,599,863 B2
(45) Date of Patent: Dec. 3, 2013

(54) SYSTEM AND METHOD FOR USING A MULTI-PROTOCOL FABRIC MODULE ACROSS A DISTRIBUTED SERVER INTERCONNECT FABRIC

(75) Inventor: Mark Bradley Davis, Austin, TX (US)

(73) Assignee: Calxeda, Inc., Austin, TX (US)

( * ) Notice: Subject to any disclaimer, the term of this patent is extended or adjusted under 35 U.S.C. 154(b) by 0 days.

(21) Appl. No.: 13/453,086

(22) Filed: Apr. 23, 2012

(65) Prior Publication Data

US 2012/0207165 A1   Aug. 16, 2012

Related U.S. Application Data

(63) Continuation-in-part of application No. 12/794,996, filed on Jun. 7, 2010.

(60) Provisional application No. 61/256,723, filed on Oct. 30, 2009.

(51) Int. Cl.
    *H04L 12/28* (2006.01)
(52) U.S. Cl.
    USPC .......................................................... 370/400
(58) Field of Classification Search
    USPC .......... 370/351–430; 709/213–216, 238–244, 709/24
    See application file for complete search history.

(56) References Cited

U.S. PATENT DOCUMENTS

| | | | |
|---|---|---|---|
| 6,990,063 B1 | 1/2006 | Lenoski et al. | |
| 7,447,197 B2 * | 11/2008 | Terrell et al. | 370/360 |
| 7,466,712 B2 * | 12/2008 | Makishima et al. | 370/401 |
| 7,606,245 B2 * | 10/2009 | Ma et al. | 370/401 |
| 7,620,057 B1 * | 11/2009 | Aloni et al. | 370/395.7 |
| 7,840,703 B2 * | 11/2010 | Arimilli et al. | 709/239 |
| 2003/0231624 A1 | 12/2003 | Alappat et al. | |
| 2005/0105538 A1 * | 5/2005 | Perera et al. | 370/396 |
| 2006/0029053 A1 * | 2/2006 | Roberts et al. | 370/378 |
| 2008/0013453 A1 | 1/2008 | Chiang et al. | |
| 2008/0183882 A1 * | 7/2008 | Flynn et al. | 709/229 |
| 2008/0320161 A1 * | 12/2008 | Maruccia et al. | 709/232 |
| 2009/0080428 A1 * | 3/2009 | Witkowski et al. | 370/392 |
| 2009/0225751 A1 | 9/2009 | Koenck et al. | |

OTHER PUBLICATIONS

International Search Report for PCT/US2010/053227 dated Dec. 16, 2010.
Written Opinion for PCT/US2010/053227 dated Dec. 16, 2010.

* cited by examiner

*Primary Examiner* — Mark Rinehart
*Assistant Examiner* — Kenneth P Hunt
(74) *Attorney, Agent, or Firm* — David O. Simmons; Davis Miles McGuire Gardner PLLC

(57) ABSTRACT

A multi-protocol personality module enabling load/store from remote memory, remote Direct memory Access (DMA) transactions, and remote interrupts, which permits enhanced performance, power utilization and functionality. In one form, the module is used as a node in a network fabric and adds a routing header to packets entering the fabric, maintains the routing header for efficient node-to-node transport, and strips the header when the packet leaves the fabric. In particular, a remote bus personality component is described. Several use cases of the Remote Bus Fabric Personality Module are disclosed: 1) memory sharing across a fabric connected set of servers; 2) the ability to access physically remote Input Output (I/O) devices across this fabric of connected servers; and 3) the sharing of such physically remote I/O devices, such as storage peripherals, by multiple fabric connected servers.

16 Claims, 7 Drawing Sheets ved by the Ethernet MAC controller, generating Eth-

SYSTEM AND METHOD FOR USING A MULTI-PROTOCOL FABRIC MODULE ACROSS A DISTRIBUTED SERVER INTERCONNECT FABRIC

CONTINUING DATA

The present application is a continuation-in-part of U.S. application Ser. No. 12/794,996 filed Jun. 7, 2010 which claims priority to U.S. Provisional Application No. 61/256,723 filed Oct. 30, 2009. The benefit of 35 U.S.C. §120 is claimed.

BACKGROUND

1. Field of the Invention

The present invention relates to a multi-protocol fabric module and in particular to a remote bus personality module. More specifically, modules and methods of use are described and include memory sharing across a fabric, the ability to access physically remote I/O devices across this fabric, and the sharing of physically remote I/O devices, such as storage peripherals.

2. Description of Related Art

Conventionally, network systems used different topologies, e.g. Ethernet architecture employed a spanning tree type of topology. Recently, Ethernet fabric topology has been developed that provides a higher level of performance, utilization, availability and simplicity. Such Ethernet fabric topologies are flatter and self-aggregating in part because of the use of intelligent switches in the fabric that are aware of the other switches and can find shortest paths without loops. One benefit is that Ethernet fabric topologies are scalable with high performance and reliability. Ethernet fabric data center architectures are available from Juniper, Avaya, Brocade, and Cisco.

A "shared nothing architecture" is a distributed computing architecture in which each node is independent and self-sufficient. Typically, none of the nodes share memory or disk storage. A shared nothing architecture is popular for web development because of its scalability. What is deficient in typical shared nothing clusters is the ability to load/store from remote memory, perform remote DMA transactions, and perform remote interrupts.

SUMMARY

The system and method of the present invention provide flexible methods of extending these distributed network systems beyond the typical shared nothing cluster to accommodate different protocols in varying network topologies. The systems and methods hereof provide the ability to load/store from remote memory, perform remote DMA transactions, perform remote interrupts, allow a wide range of use cases that greatly extend performance, power optimization, and functionality of shared nothing clusters. Several examples are described which include network acceleration, storage acceleration, message acceleration, and shared memory windows across a power-optimized interconnect multi-protocol fabric.

In one form, the invention relates to a network system having compute nodes connected by a switched interconnect fabric, a plurality of switching nodes each having a multi-protocol routing header processor that inspects incoming data packets and adds a routing header for data packets entering the network system and removes a routing header from data packets exiting said network system. Each node includes a bus fabric for carrying processor mastered load and store transactions to memory and I/O. First and second protocol processors are included in each node and has an address translation module connected to a bus fabric for accepting a data packet in a first protocol, and a first protocol processor module for adding a routing header to said data packet for entering packets and for removing a routing header for exiting data packets and a second protocol processor which functions similar to the first. Finally, each node includes a fabric switch connected to said first and second protocol processors for inspecting data packet routing headers and routing said data packets to a port based only on said routing header. Therefore, each node can operate as a compute and/or switch and can accommodate different protocols in varying topologies.

In another form, a multi-protocol fabric module is disclosed for transporting data packets across the fabric where the packets have different protocols. The multi-protocol fabric module includes an Ethernet portion having an Ethernet MAC controller connected to the fabric and generating Ethernet frames and an Ethernet Bridge Personality Module connected to a Ethernet MAC controller to prepend a fabric routing header to the Ethernet frame to create a routing frame. A fabric switch is coupled to the Ethernet Bridge Personality Module for accepting a routing frame and outputting the routing frame to another node. The multi-protocol fabric module also includes a Remote Bus portion having a remote address translation module connected to the fabric for converting a local address to a remote node address, a bus bridge connected to the remote address translation module to convert a remote node address to a remote packet, a Remote Bus Personality Processor connected to said bus bridge for adding a routing header to the remote node packet to create a routing packet. The Remote Bus Processor is coupled to the fabric switch such that the fabric switch accepts the routing packet and outputs the routing packet to another node.

DETAILED DESCRIPTION

Figure 1:
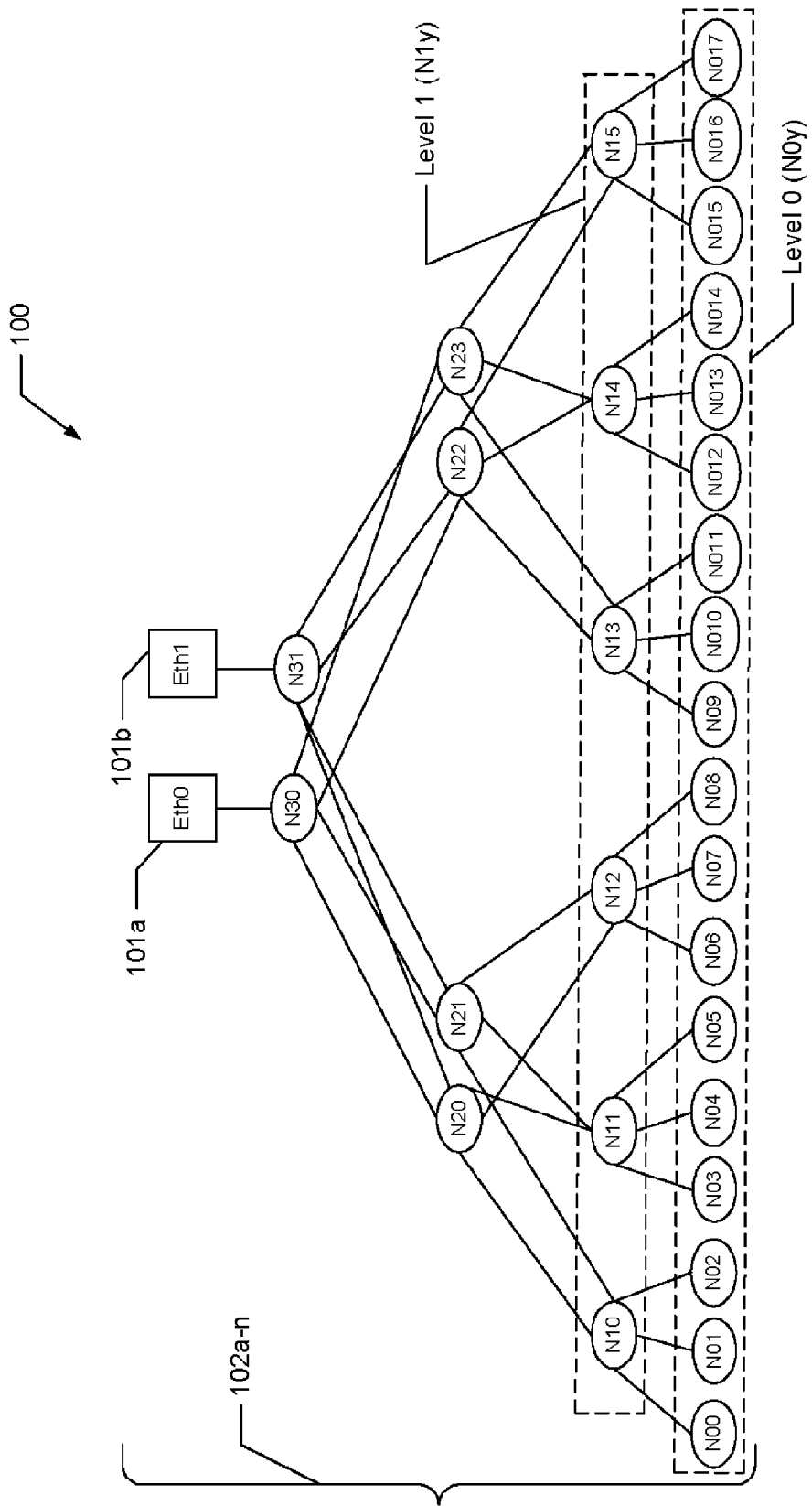
FIG. 1 is a high level diagram of a topology for a network system.

FIG. 1 shows an example of a high-level topology of a network system 100 that illustrates compute nodes connected by a switched interconnect fabric. Network ports 101a and 101b come from the top of the fabric to external network connectivity. These network ports are typically Ethernet, but other types of networking including Infiniband are possible. Hybrid nodes 102a-n are compute nodes that comprise both computational processors as well as a fabric packet switch. The hybrid nodes 102a-n have multiple interconnect links to comprise the distributed fabric interconnect.

A recommended implementation for the fabric interconnect is a high-speed SerDes interconnect, such as multi-lane XAUI. In the preferred solution, a four-lane XAUI interconnect is used. Each of the four lanes can also have the speed varied from 1 Gb/sec (SGMII), XAUI rate (3.125 Gb/sec), and double XAUI (6.25 Gb/sec). The actual number of lanes and variability of speeds of each lane are implementation specific, and not important to the described innovations. Other interconnect technologies can be used that have a means to adaptively change the effective bandwidth, by varying some combination of link speeds and widths. Power consumption of a link is usually related to the delivered bandwidth of the link. By reducing the delivered bandwidth of the link, either through link speed or width, the power consumption of the link can be reduced.

Related application Ser. No. 12/794,996 (incorporated by reference) describes the architecture of a power-optimized, high performance, scalable inter-processor communication fabric. FIG. 1 shows a high-level topology 100 of a network system, such as described in the '996 Related Application, that illustrates XAUI connected System on a Chip (SoQ nodes connected by the switching fabric. The 10 Gb Ethernet ports Eth0 101a and Eth1 101b come from the top of the tree. Most, if not all of the hybrid nodes 102a-n comprise both computational processors as well as an embedded switch as described below in conjunction with FIGS. 2-3. The hybrid nodes 102a-n have five XAUI links connected to the internal switch. The switching layers use all five XAUI links for switching. For example, as shown in FIG. 1, level 0 leaf nodes 102d, e (i.e., N0n nodes, or Nxy, where x=level and y=item number) only use one XAUI link to attach to the interconnect, leaving four high-speed ports that can be used as XAUI, 10 Gb Ethernet, Peripheral Component Interconnect Express (PCIe, Serial AT Attachment (SATAN, etc., for attachment to I/O. The vast majority of trees and fat tree-type network systems have active nodes only as leaf nodes, and the other nodes are pure switching nodes. This approach makes routing much more straightforward. Network system 100 has the flexibility to permit every hybrid node 102a-n to be a combination computational and switch node, or just a switch node. Most tree-type implementations have I/O on the leaf nodes, but system 100 lets the I/O be on any node. In general, placing the Ethernet at the top of the tree as at 101a/101b minimizes the average number of hops to the Ethernet.

In a preferred example, the hybrid nodes 102a-n shown in the tree-oriented topology of system 100 in FIG. 1 may represent independent nodes within a computing cluster. FIG. 1 illustrates one example implementation of individual nodes 102a-n of the cluster. When looking at a conventional implementation of a topology e.g. in FIG. 1, computing nodes are usually found in the lower level leaf nodes (e.g. N00-N017), and the upper level nodes do not have computing elements but are just network switching elements (N20-N31).

Figure 2:
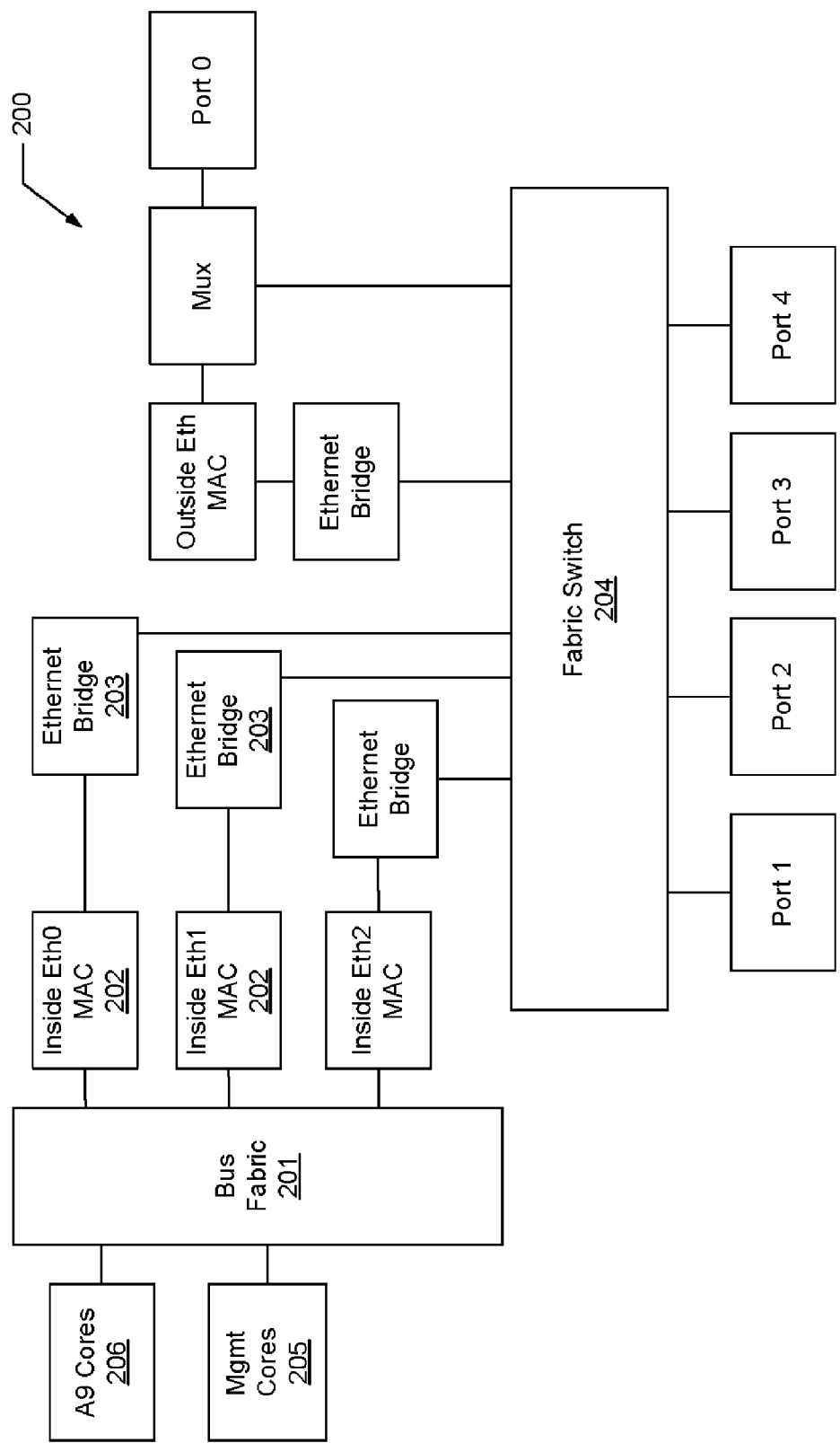
FIG. 2 is a block diagram of a network node in accordance with one embodiment of the present invention.

FIG. 2 illustrates one example of a "personality module" 200 in accordance with the present invention which is specifically designed for Ethernet protocol. Such an Ethernet personality module 200 can be used as a hybrid node for one or more of the nodes 102a-n of FIG. 1. With the node architecture shown in FIG. 2, the CPU Cores 206 of each personality module may be optionally enabled, or could be just left powered-off. With a personality module 200 used for the upper level switching nodes (N20-N30) in FIG. 1, the modules can be operated as pure switching elements (like traditional implementations), or the CPU Cores module 206 can be enabled and used as complete compute nodes within the computing cluster.

Note that the tree oriented interconnect fabric of FIG. 1 is simply one example of a type of server interconnect fabric. The concepts and inventions described herein have no dependency on the specific topology of interconnect fabric or protocol employed.

In more detail, the personality module 200 of FIG. 2 may be used as one or more of the hybrid nodes in the network system of FIG. 1. In FIG. 2, processors 205/206 communicate with the Ethernet MAC controllers 202 via the internal SOC processor bus fabric 201. Ethernet MAC controllers 202 generate Ethernet frames. The Ethernet, Bridges 203 prepend a fabric routing header to the beginning of the Ethernet Frame. The Ethernet Bridges 203 contains the layer 2 Ethernet processing and computes the routing header based upon a distributed layer 2 Ethernet switch.

The Ethernet Bridges 203 in FIG. 2 receives an Ethernet frame from the Ethernet MAC controllers 202 in FIG. 2, sending an augmented routing frame to the fabric switch 204. Note that all frames that are flowing within the fabric are routing frames, not Ethernet frames. The Ethernet frame/routing frame conversion is done only as the packet is entering or leaving the fabric via a MAC. Note also that the routing logic within the switch may change fields within the routing frame. The Ethernet frame is never modified (except the adding/removing of the preamble, start of frame, and inter-frame gap fields).

The routing frame is composed of several fields providing sufficient data for the fabric switch 204 of FIG. 2 to make routing and security decisions without inspection of the underlying Ethernet frame which is considered an opaque payload. The resulting routing frame is thus a catenation of the routing frame header and the payload frame.

Related application Ser. No. 12/794,996 (incorporated by reference) disclosed in more detail an Ethernet protocol focused fabric switch. In the related '996 application two primary components are described:

An Ethernet Routing Header processor that inspects Ethernet frames, and adds/removes the fabric switch routing header.

The fabric switch that is responsible for transporting the packet between nodes by only using data from the routing header.

A key attribute of the Fabric Switch, 204 in FIG. 2, is that packets may be securely routed to their destination node/port by only using data in the routing header, without any inspection of the underlying data payload. Thus the data payload is considered opaque and invariant.

Figure 3:
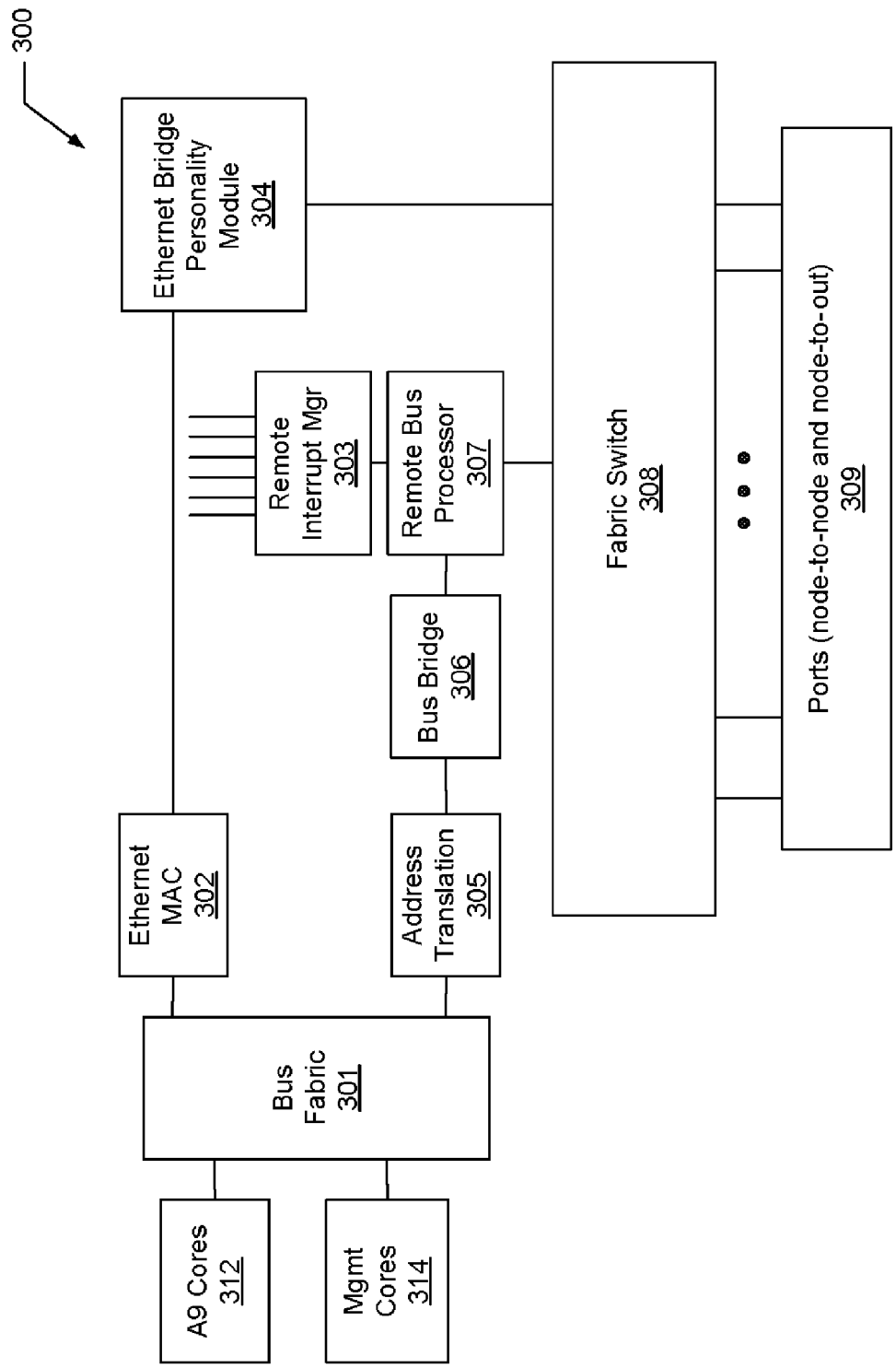
FIG. 3 is a block diagram of a network node in accordance with a second embodiment of the present invention.

FIG. 3 illustrates a preferred embodiment of a multi-protocol personality module 300 that is similar to the Ethernet protocol module of FIG. 2. The module of FIG. 3 is similar to the Ethernet fabric module of FIG. 2 in that it continues to be responsible for transporting packets between nodes by only using data from the routing header. However, the multi-protocol personality module 300 of FIG. 3 operates with multiple protocols to accommodate a network operating with different protocols. Protocol specific personality modules are added such that routing header processing is done in new and separate fabric personality modules that provide mappings from specific protocol semantics to fabric routing headers. The multi-protocol personality module 300 of FIG. 3, like the Ethernet module of FIG. 2, is responsible for adding a routing header for packets entering the fabric, and removing the routing header when packets are leaving the fabric. The routing header maintains in place as the packets are transported node to node across the fabric.

The multi-protocol personality module 300 of FIG. 3 includes a portion for processing Ethernet (302, 304) which function much like the module of FIG. 2, and a Remote Bus Personality portion (303, 305, 306, 307). The Remote Bus Personality portion allows bus transactions to be transported across the fabric, offering the ability to remote memory, I/O, and interrupt transactions across the fabric.

As can be seen from the block diagram of FIG. 3 depicting an exemplary multi-protocol module 300, the Fabric Switch 308 transports packets across nodes of inter-node fabric by inspection of only the routing header. The routing header is composed of several fields providing sufficient data for the fabric switch 308 to make routing and security decisions without inspection of the underlying opaque data payload. The resulting routing frame is thus a catenation of the routing frame header and the opaque payload frame. One example of a payload frame is an Ethernet frame. For example, a routing frame might comprise:

| Routing Frame Header | Ethernet Frame Packet | | | |
|---|---|---|---|---|
| RF Header | MAC destination | MAC Source | Ethertype/ Length | Payload (data and padding) | CRC32 |

An example of a routing header is shown in the following table, but the fields may vary by implementation. This table shows ports corresponding to those shown in the Ethernet personality module 200 of FIG. 2, which has 4 Ethernet ports on the fabric switch that can map to the port #s of 0-3 of this table.

| Field | Width (Bits) | Notes |
|---|---|---|
| Domain ID | 5 | Domain ID associated with this packet. 0 indicates that no domain has been specified. |
| Mgmt Domain | 1 | Specifies that the packet is allowed on the private management domain. |
| Source Node | 12 | Source node ID |
| Source Port | 2 | 0 = MAC0, 1 = MAC1, 2 = MAC_management processor, 3 = MAC_OUT |
| Dest Node | 12 | Destination node ID |
| Dest Port | 2 | 0 = MAC0, 1 = MAC1, 2 = MAC_management processor, 3 = MAC_OUT |
| RF Type | 2 | Routing Frame Type (0 = Unicast, 1 = Multicast, 2 = Neighbor Multicast, 3 = Link Directed) |
| TTL | 6 | Time to Live—# of hops that this frame has existed. Switch will drop packet if the TTL threshold is exceeded (and notify management processor of exception). |
| Broadcast ID | 5 | Broadcast ID for this source node for this broadcast packet. |
| Checksum | | Checksum of the frame header fields. |

Since the Fabric Switch 308 makes routing decisions by inspection of only the routing header, and the data payload frame is considered both opaque and invariant, these characteristics can be leveraged to create an extensible set of personality modules. A multi-protocol personality module 300 such as shown in FIG. 3 provides a mapping from specific protocols to add and remove the fabric routing headers for that protocol.

When using a personality module 300 such as shown in FIG. 3 as a hybrid node 102a-n in the system of FIG. 1, as previously stated, all frames that are flowing within the fabric are routing frames, not Ethernet frames. The payload frame/routing frame conversion is done only as the packet is entering or leaving the fabric. Note also that the routing logic within the switch may change fields within the routing frame. The payload frame is never modified.

The Ethernet_Bridge personality processor 304 in FIG. 3, is functionally identical to the Routing Header processor in Related application Ser. No. 12/794,996, but generalized from a single-protocol processor (such as FIG. 2), to a module having a number of protocol processing portions. The Ethernet Bridge Processor 304 adds the routing header as the packet comes from the Ethernet MAC 302 to the fabric switch 308, and removes the routing header as the packet comes from the fabric switch 308 to the MAC 302.

Similar to FIG. 2, the processors 312/314 communicate with the Ethernet MAC controllers 302 in FIG. 3 via the internal SOC processor bus fabric 301. Ethernet MAC controllers 302 generate Ethernet frames. The Ethernet Bridge 304 prepends a fabric routing header to the beginning of the Ethernet Frame. The Ethernet Bridge 304 contains the layer 2 Ethernet processing and computes the routing header based upon a distributed layer 2 Ethernet switch.

FIG. 3 also illustrates the architecture of the Remote Bus fabric personality processor using components 303, 305, 306, 307. In FIG. 3, the Bus Fabric 301, represents the internal bus fabric of an SOC. This bus fabric carries CPU mastered load/store transactions to memory and I/O, as well as I/O mastered transactions, e.g. initiated by I/O DMA controllers.

The functionality of the Remote Bus fabric personality portion consists of:
  The Remote Address translation module 305 which converts local addresses steered to the Remote Bus Fabric Personality Module (RBFPM) to [Remote Node, Remote Node Address].
  The bus bridge, 306, which converts a processor bus packets of arbitrary address and data width into a packed, potentially multi-flit packet.
  The Remote Bus processor 307, which adds and removes the fabric routing header, transports bus packets from bus bridge 306 and interrupts from interrupt manager 303 over the fabric in-order with guaranteed delivery.

The Remote Address translation module 305 converts local addresses steered to the RBFPM to [Remote Node, Remote Node Address]. This is depicted in more detail in FIG. 4 which shows that there is a set of mapping tables from [local address, size] to [Node ID, Remote address]. This address translation can be implemented as a custom module, typically leveraging a CAM (Content Addressable Memory). Alternatively, this stage may be implemented with a standard IP block of an I/O MMU (memory management unit) which translates the intermediate physical address in a bus transaction to a physical address. In this case, these translation tables are configured so that the resulting physical address encodes the [Remote Node ID, and Remote Address].

The bus bridge/packetizer 306 of FIG. 3 functions to interface to and packetize the CPU/I/O bus transactions. This Bus Bridge 306 is conceptually designed as having a layered model. In any given implementation, these layers may or may not be present, and will have tuned functionality for the bus bridging that is being implemented.

The multiple layer design of the Bus Bridge 306 is:
  Transaction layer
    The Transaction layer performs any necessary transforms that understand multiple bus channels or that understand the semantics of the transaction.
  Transfer layer
    The Transfer layer performs any necessary transforms within a channel related to the overall data transfer. This could include data compression.
  Data Link layer
    The Data Link layer performs arbitration, multiplexing and packing of channels to a physical packet representation.
    Implements any necessary flow control.

Physical layer

The Physical layer performs transformation and optimization of the physical packet representation to packet size, width, and flit requirements to the fabric switch implementation. This Physical layer may actually produce multiple flits corresponding to a single physical bus packet.

The Remote Bus processor 307 functions in a similar manner to the Ethernet Bridge Personality Processor 304 to add and remove the fabric routing header and transport bus packets from 306 to the fabric switch 308. Additionally, the Remote Bus processor 307 connects interrupts from Remote Interrupt Manager 303 over the fabric with guaranteed delivery.

Example 1

Distributed One-Sided Cache Coherent Shared Memory Across the Fabric

In FIG. 1, one or more of the compute nodes could constitute servers, and the fabric connects two or more servers. The ability to open up memory sharing windows in another server across the fabric enables a wide-range of new capabilities that are not possible in traditional "shared nothing" clusters. In this example, the form that a load or store bus transaction issued by Server Node A is targeting a physical address in Server Node B. Such bus transactions may originate from any bus master in Node A, including processors, I/O bus masters (such as a SATA controller), or a DMA engine.

Figure 4:
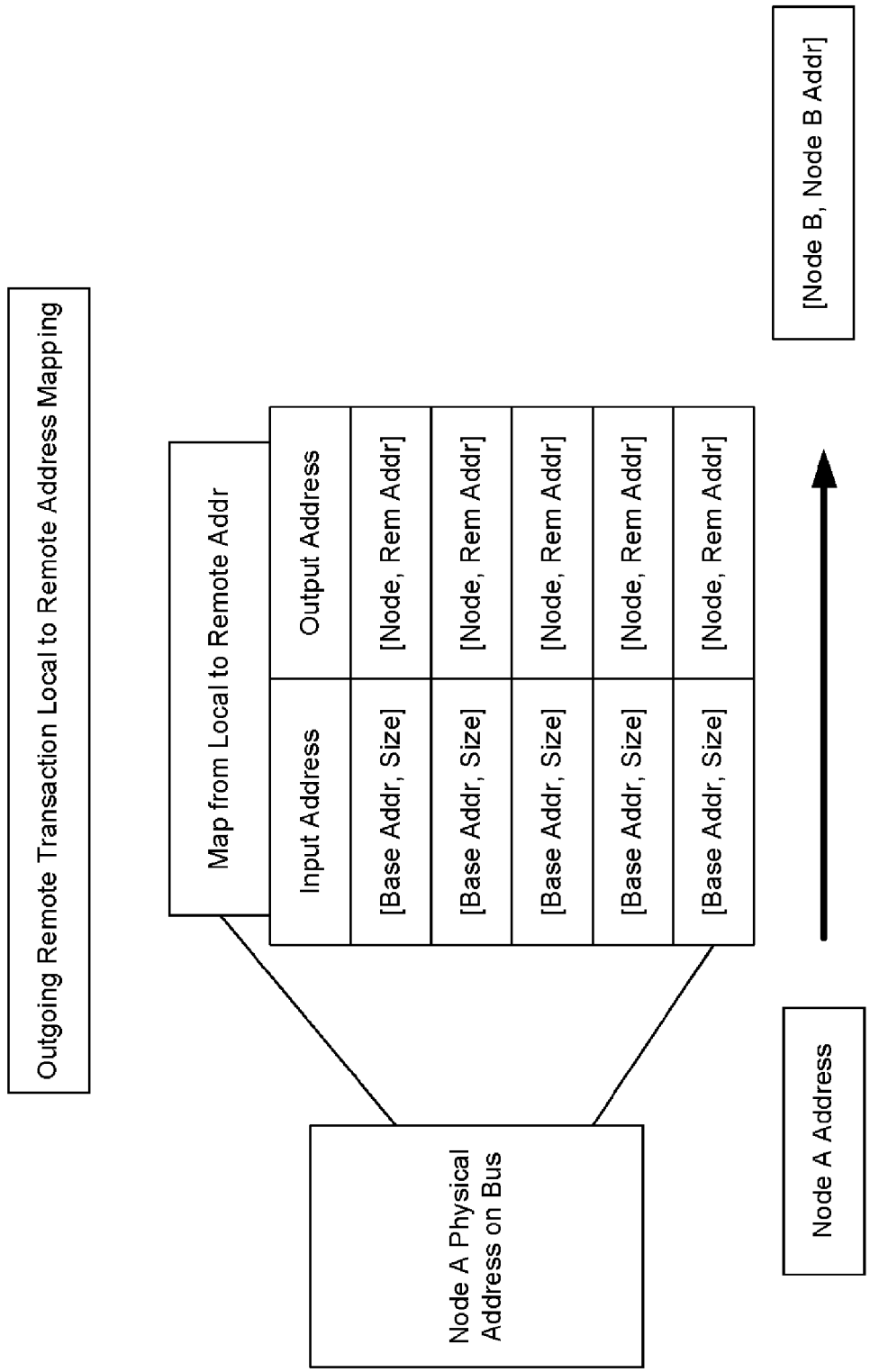
FIG. 4 is a diagram showing local to remote address mapping.

FIG. 4 illustrates the first stage of a remote shared memory access transaction using the Remote Bus Personality portion of the module of FIG. 3. As shown in FIG. 4, a bus master on Node A issues a load or store transaction to a range of physical addresses mapped to the Remote Bus Personality portion The transaction appears as a bus transaction on FIG. 3, on Bus Fabric 301. The SOC busses of Bus Fabric 301, such as an ARM AXI, have configurable address and data widths, as an example 40 address bits, and 64-128 data bits.

The transaction flows through the Bus Bridge 306 as illustrated in FIG. 3 packetizing the bus transaction and creating one or more flits optimized for the fabric switch 308. The packetized transaction flows through the Remote Bus Personality Processor 307 to create the routing header for the fabric. The remote bus packets are required to be delivered to destination server B in-order and with guaranteed delivery. If the underlying fabric and fabric switch do not implicitly have these characteristics, then the Remote Bus Personality Processor 307 is required to implement in-order and guaranteed delivery.

The resulting routing frame flows into the fabric switch 308 on Node A, is routed through the intervening fabric (See FIG. 1), which may consists of multiple routing hops, and is delivered to the fabric switch on target Node B. For example, comparing FIG. 1, Node A might be node N30 and target Node B could be represented as node N014. The packet from fabric switch 308 of Node A is identified as a remote bus transaction, and is delivered to the Remote Bus Personality Processor 307 on Node B.

Node B's Remote Bus Personality Processor 307 implements the receiving side of in-order and guaranteed delivery in conjunction with the transmitting side. This can include notification of the sender of errors, missing flits, and request for retransmission. The Remote Bus Personality Processor 307 of Node B then strips the routing header, sending the packetized transaction into the Bus Bridge 306. The Bus Bridge module 306 of Node B unpacks the packetized transaction (which may have included collecting multiple flits), and reconstitutes a valid transaction posted to Node B's bus. Any responses to that bus transaction are seen by this subsystem, and sent back to Node A following the same mechanism.

There are several functional and performance issues related to this cache coherency example. First, coherent memory transactions issued by CPUs in node A will not snoop caches on remote nodes to maintain efficiency. Second, incoming remote transactions from a Remote Bus Personality section can be implemented as one-sided cache coherent. This means that incoming loads or stores can optionally be configured to snoop and perform coherency protocols against processor caches. Finally, this provides a powerful, easy to use cache coherent programming mode without the performance and availability problems related to a full CC-NUMA (cache coherent—non-uniform memory access) design.

Example 2

Remote Bus Personality Module—Remote Interrupts

In many SOC bus infrastructures, interrupts are individual lines that feed into an interrupt controller for the processor(s) such as the Remote Interrupt Manager 303 of FIG. 3. These individual interrupt lines are sometimes OR'd with each other to map multiple interrupt sources to a single interrupt line.

For example, if server A (such as Node N30 of FIG. 1) processor generates an interrupt on server B (such as Node N14 of FIG. 1): First, Server A writes to a remote CSR (control status register) on server B which maps to the requested interrupt, such as the an interrupt line of Interrupt Manager 303 of FIG. 3. The interrupt line is made active and interrupts processor 307 on server B.

As another example, an I/O interrupt on server A can be reflected to an interrupt on server B. An I/O controller on server A (like a SATA controller) raises an interrupt line that is being monitored by the Remote Interrupt Manager 303, FIG. 3. The Remote Interrupt Manager 303 gets woken by an interrupt line that it is being monitored. Remote Interrupt Manager 303 creates a packet tagged as an interrupt packet and sends it into the Remote Bus Personality Processor 307. This interrupt packet flows through the fabric as described above. When the interrupt packer reaches server B, the interrupt packet is delivered to Remote Bus Personality Processor 307, which notes the specially tagged interrupt packet and sends it to the remote interrupt manager 303 of server B. Remote interrupt manager 303 causes the specified interrupt line to go active in server B.

Example 3

Remote Address Translation and Security

Referring to FIG. 3, block 314 is a management CPU core (See also Mgmt Core 205 of FIG. 2). This management CPU 314 is a key part of maintaining fabric security for remote bus transactions. The management CPU 314 maintains multi-node fabric transaction security on both sides of the transaction.

Each Remote Bus Personality processor 307 is allocated a range of addresses in IPA space. An exemplary process for the secure mapping of an address range from Server B into Server A's address space is as follows.
1. Main OS processor on Server A (block 312 in FIG. 3) sends a mapping request of tuple (node #, physical address in node #'s address space, and window length) to local management processor.

2. Management CPU 314 on Server A has the ability to accept or deny the remote mapping request. Upon local acceptance, management CPU on server A sends a secure management request with the remote mapping request to management CPU 314 on server B.
3. Management CPU 314 on server B has the ability to accept or deny the remote mapping request from Server A.
4. Upon acceptance, management CPU 314 on server B installs a mapping into the I/O MMU on server B, mapping an IPA window to the requested physical address. Additionally the remote bus personality Processor 307 on server B installs a mapping that designates that remote node A has access to that window.

Mappings can be granted as read-only, write-only, or read-write.

Figure 5:
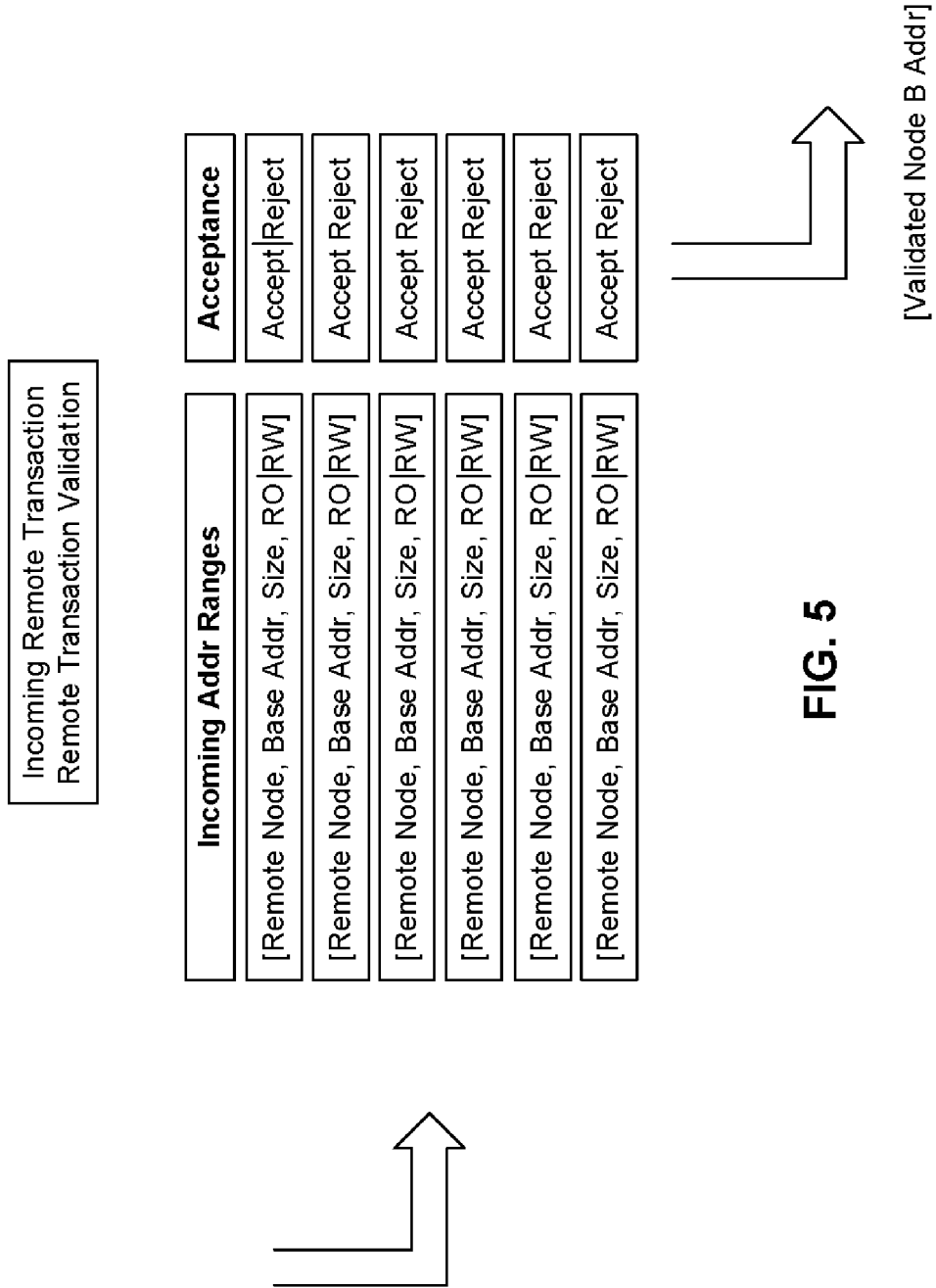
FIG. 5 is a diagram showing validation of a remote transaction.

These mappings are illustrated in FIG. 5.

These mappings can be implemented using a standard IP block like an I/O MMU, or with custom logic typically using a CAM.
5. Management CPU 314 on server B returns the base intermediate physical address of the window.
6. Management CPU 314 on server A installs a mapping into the local I/O MMU mapping from an IPA window on server A to the server B IPA window base address.
7. Management CPU 314 on server A returns the allocated local IPA address for the requested window to the requesting client on the main OS processor 312.

In the described examples, DMA engines on both the local (server A) and remote (server B) sides can be used to hardware facilitate data movement in either direction. User's are not constrained to the classic push OR pull data movement model. Further, many SOC bus transaction models have some notion of trust or security zone associated with that bus transaction. As an example, ARM AXI has the notion of TrustZone, where transactions are marked as being in Trusted World or Normal World. The Remote Bus portion in the Personality Module 300 illustrated in FIG. 3 annotates the bus transaction packet with the trust or security zone with the incoming bus transaction. When the remote server (e.g. server B) is issuing the remote transaction into the local bus fabric, a configuration option is used to define whether the transactions get issued with either the security zone of the requesting processor, or issued at a specific security zone level.

Example 4

Remote Bus FPM I/O Physicalization

Figure 6:
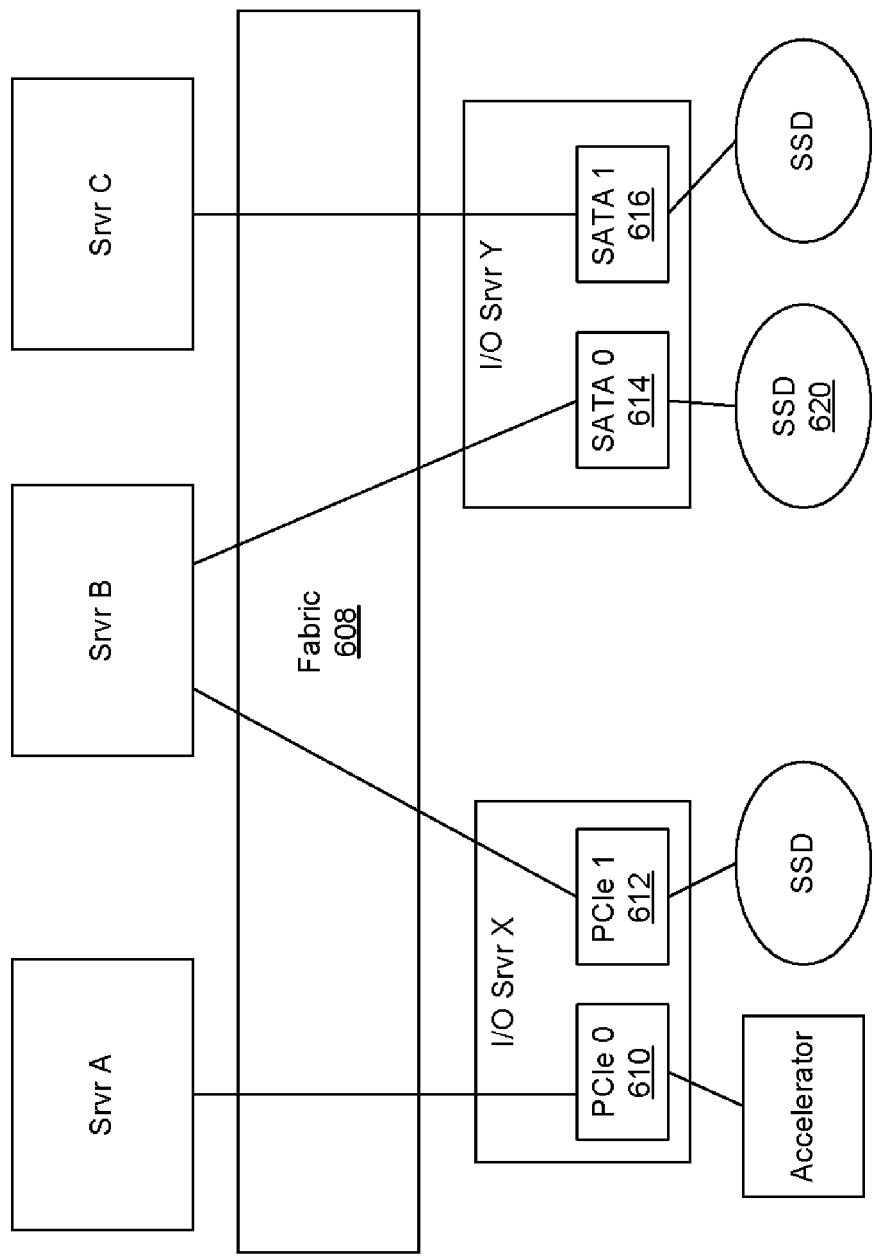
FIG. 6 is a schematic depicting an I/O physicalization.

FIG. 6 illustrates using the Remote Bus Fabric Personality portion of the Module 300 of FIG. 3 for I/O Physicalization. Some data center customers desire to have compute servers that have no embedded storage or I/O within the server, and then separate I/O boxes/chassis within the data center rack. The Remote Bus Personality portion of FIG. 3 allows multiple servers, designated as Srvr A, B, and C in FIG. 6, to use unmodified device drivers within the operating systems running in servers A, B, and C to access physically remote I/O devices across the server fabric. The server operating system, device drivers, and applications believe that they are communicating with server local devices. Use of the Remote Bus Personality Module nodes of FIG. 3 allows the device I/O and interrupts to the actual I/O device to be bi-directionally remoted across the fabric with no changes or visibility to software.

Device drivers running on CPUs in the Server boxes (A, B, C) of FIG. 6 access I/O registers transparently across Fabric 608 in the remoted peripheral controller cards, illustrated as remote PCIe controllers 610/612 and remote SATA controllers 614/616 in FIG. 6. Direct memory access ("DMA") engines are located either in the server boxes, or alternatively in the I/O boxes embedded within the peripheral controllers, and the DMA traffic is remoted bi-directionally transparently across Fabric 608. Additionally, interrupts generated by the remote peripheral controllers are transparently transmitted across Fabric 608 and presented to the processors in servers A, B, or C.

The address maps, both I/O and memory, and interrupt maps are maintained and transmitted transparently across Fabric 608. In this example, the data flow is completely optimized. An example storage block transfer from SATA controller 614/616 of FIG. 6 would typically become:

The device driver on Srvr B is reading a block from remote SATA 614 connected Solid State Drive (SSD) 620 to a pre-allocated block buffer on a physical address PA1.

The device driver programs and initiates the read by writing the appropriate control registers in remote SATA controller 614.

Remote SATA controller 614 contains an embedded DMA engine which initiates the DMA, reading the data from the remoted SSD, and landing the data directly into physical address PA1 in Srvr B's address space.

No network communication or additional data copies were needed in this optimized transfer.

Example 5

Figure 7:
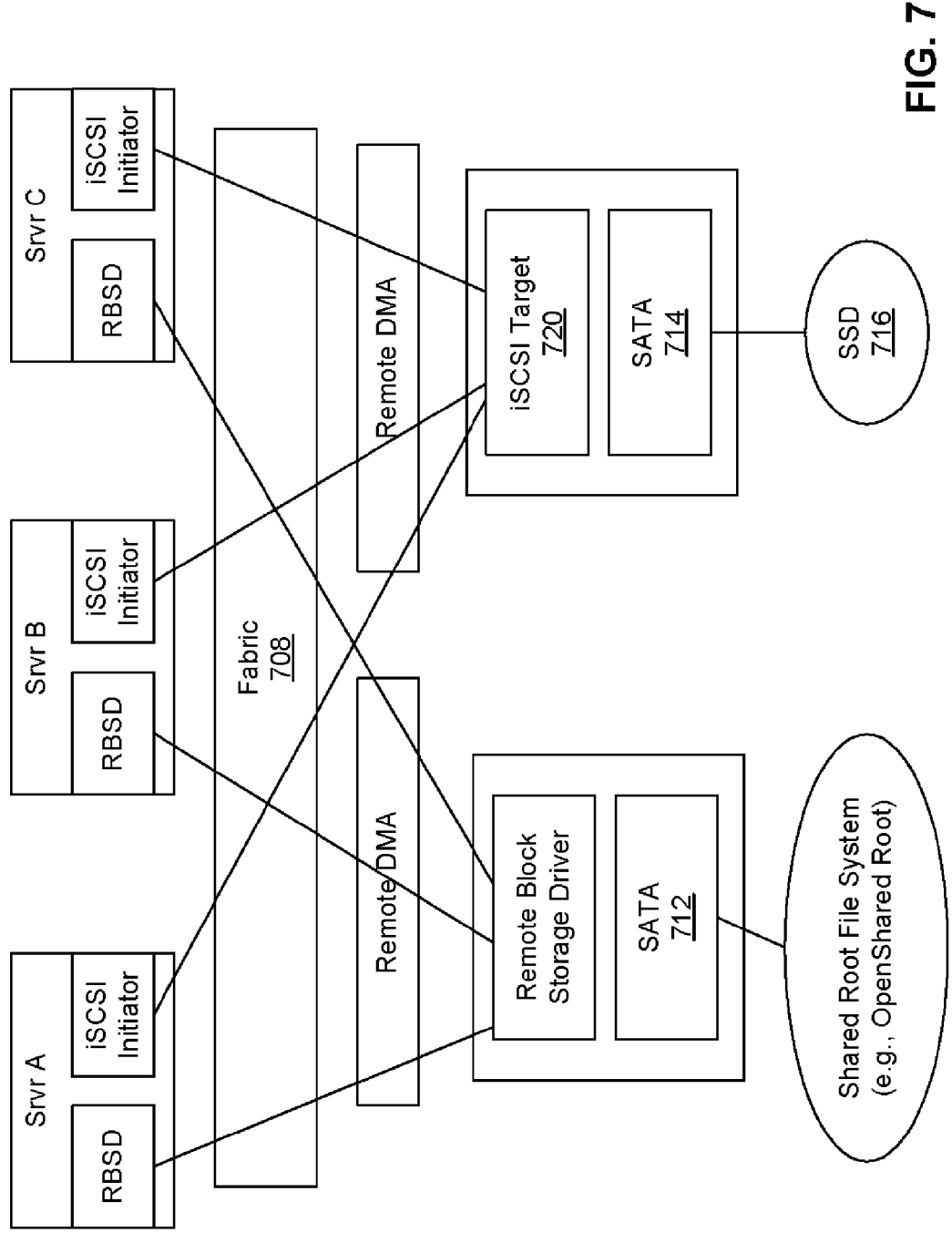
FIG. 7 is a schematic showing high performance distributed shared storage.

Remote Bus Personality Module Enabling High Performance Distributed Shared Storage FIG. 7 illustrates an alternate distributed storage example. In this case the computational servers are illustrated as Srvr A, B, C. The I/O server boxes containing the storage peripherals in this use case have processors as well. This high performance shared storage example has one additional data movement from example 4: I/O physicalization. However, this example 5 adds the additional capabilities that the I/O devices and controllers can be shared by multiple servers.

In FIG. 7 a method of storage block transfer from a SATA controller is as follows.

The device driver on Srvr A is reading a block from remote SATA 714 connected SSD 716 to a pre-allocated block buffer on a physical address PA1.

The read is initiated by sending a lightweight message across Fabric 708 from Srvr A to Target I/O server 720 that contains the description of the read (device, block, size) and the physical address in Srvr A that the data should be moved to.

The driver on SATA device 714 on Target I/O server 720 initiates the DMA read to its local buffer from it's local SATA controller.

Upon the completion of the DMA transfer to the I/O servers buffer, the device driver on the I/O server 720 uses a local DMA engine to initiate a fabric remoted DMA transfer from it's local buffer to the physical address of the buffer in the requesting server's address space.

The device driver programs and initiates the read by writing the appropriate control registers in controller of remote SATA 714.

This example requires one additional data movement as compared to the I/O Physicalization example 4, but is far more efficient than a traditional network oriented SAN or NAS remote storage data movement.

What is claimed is:

1. In a network system having compute nodes connected by a switched interconnect fabric, a plurality of switching nodes each comprising:
   one or more processors;
   a bus fabric coupled to the one or more processors;
   a fabric switch coupled to the switched interconnect fabric, wherein the fabric switch is configured for inspecting a data packet routing header of a packet and causing the packet to be routed to its destination within the switched interconnect fabric based only on information contained within said routing header; and
   a plurality of protocol specific personality modules each coupled in parallel between the bus fabric and the fabric switch, wherein at least two of the protocol specific personality modules are configured in accordance with different protocols with respect to each other and wherein each one of the protocol specific personality modules includes:
      a routing header processor that inspects data packets received thereby and adds a routing header for data packets destined for entering the switched interconnect fabric and removes a routing header from data packets received from the switched interconnect fabric, wherein said adding and removing of the routing header is performed based on a protocol-dependent basis.

2. A System on a Chip (SoC) fabric node for transporting data packets across a fabric, comprising:
   one or more processors;
   a bus fabric coupled to the one or more processors;
   a fabric switch coupled to the fabric, wherein the fabric switch allows a packet to be routed to its destination within the fabric using only information in a fabric routing header thereof without any inspection of underlying data payload associated therewith;
   an Ethernet portion coupled between the bus fabric and the fabric switch, wherein the Ethernet portion includes:
      an Ethernet MAC controller connected to the bus fabric and generating Ethernet frames;
      an Ethernet Bridge Personality Module connected to said Ethernet MAC controller to prepend a fabric routing header to the Ethernet frame to create a routing frame capable of being routed to its destination within the fabric using only information in the fabric routing header thereof;
      the Ethernet Bridge Personality Module coupled to the fabric switch, wherein the fabric switch accepts a routing frame and outputs the routing frame to another node of the fabric; and
   a Remote Bus portion coupled between the bus fabric and the fabric switch in parallel with the Ethernet portion for enabling bus transactions to be transported between nodes of the fabric, wherein the Remote Bus portion includes:
      a remote address translation module connected to the bus fabric for converting a local address of a bus transaction to a remote node address;
      a bus bridge connected to said remote address translation module to packetize the bus transaction;
      a Remote Bus Personality Processor connected to said bus bridge for adding a fabric routing header to said packetized bus transaction to create a routing packet capable of being routed to its destination within the fabric using only information in the fabric routing header thereof; and
      said Remote Bus Personality Processor being coupled to said fabric switch, wherein the fabric switch accepts the routing packet and outputs the routing packet to another node of the fabric.

3. The SoC fabric node of claim 2, wherein the Remote Bus portion includes a remote interrupt manager connected to said Remote Bus Personality Processor and to an interrupt line, wherein said interrupt manager accepts an interrupt and creates a packet tagged as an interrupt packet and sent to said Remote Bus Personality Processor.

4. A Remote Bus Personality Portion of a first one of a plurality of System on a Chip (SoC) fabric nodes, comprising:
   a remote address translation module connected to a bus fabric of the first one of the plurality of SoC fabric nodes for accepting a data packet having a local address and converting the local address to a remote address of a second one of the plurality of SoC fabric nodes;
   a bus bridge for transforming a bus transaction to one or more flit packets compatible with a switched interconnect fabric through which the first one of the plurality of SoC fabric nodes is coupled to the second one of the plurality of SoC fabric nodes;
   a remote bus processor module for adding a routing header to said one or more flits packet destined for entering the switched interconnect fabric through a fabric switch that allows the one or more flit packets to be routed to an intended destination thereof within the fabric using only information in the fabric routing header thereof without any inspection of underlying data payload associated therewith, wherein information in the routing header is representative of the intended destination thereof; and
   a fabric switch connected to said remote bus processor module for inspecting routing headers and routing said data packets to a port based only on said routing header.

5. The Remote Bus Personality Portion of claim 4, including an interrupt line extending to an interrupt manager in said module, and said interrupt manager being connected to said remote bus processor module for generating an interrupt originating from one node in the fabric to another node in the fabric.

6. A method of sharing memory across nodes in a fabric of interconnected nodes, comprising:
   issuing a load/store transaction to a Remote Bus Personality Portion of a local System on a Chip (SoC) fabric node as a bus transaction;
   packetizing the bus transaction and creating one or more flits compatible with the fabric;
   creating a routing header for a destination SoC fabric node and prepending the routing header to said one or more flits to create a routing frame capable of being routed to the destination SoC fabric node using only information in the fabric routing header thereof;
   transmitting the routing frame into said fabric and delivering it to the destination SoC fabric node using only information contained within the routing header; and
   unpacking a payload portion of the routing frame, wherein unpacking the payload portion includes removing the routing header and posting the payload portion as a load/store transaction in the destination SoC fabric node thereby resulting in the bus transaction being transported across the fabric from the local SoC fabric node to the destination SoC fabric node.

7. A method of accessing a physically separate Input/Output (I/O) device by a server where the I/O device and the server are nodes in a fabric of interconnected nodes, comprising:

issuing a bus transaction to a Remote Bus Personality Portion of the server, wherein the Remote Bus Personality portion is coupled between a bus fabric and a fabric switch of the server for enabling the bus transaction to be transported between nodes of the fabric, wherein the Remote Bus Personality portion includes a remote address translation module connected to the bus fabric for converting a local address of the bus transaction to a remote node address, a bus bridge connected to said remote address translation module to packetize the bus transaction, and a Remote Bus Personality Processor connected to said bus bridge for adding a fabric routing header to said packetized bus transaction to create a routing packet capable of being routed to its destination within the fabric using only information in the fabric routing header thereof, wherein the Remote Bus Personality Processor is coupled to said fabric switch, and wherein the fabric switch accepts the routing packet and outputs the routing packet to another node of the fabric;

sending the bus transaction from the Remote Bus Personality Portion to the I/O device via the fabric;

creating a routing header at the I/O device for said server and prepending the routing header to a payload to create a routing frame capable of being routed to a destination node using only information in the fabric routing header thereof;

transmitting the routing frame from the I/O device into said fabric and delivering it to said server using only information contained within the routing header; and unpacking the payload portion of the routing frame at the server, wherein unpacking the payload portion includes removing the routing header and posting the payload portion in the server thereby resulting in the bus transaction being transported across the fabric from the I/O device to the server.

8. The method of claim 7, wherein said I/O device is a remote Peripheral Component Interconnect Express (PCIe) controller.

9. The method of claim 7, wherein said I/O device is a remote Serial AT Attachment (SATA) controller.

10. The method of claim 7, including a DMA engine in said I/O device.

11. The method of claim 7, including routing DMA traffic bi-directionally via said fabric.

12. The method of claim 7, including generating an interrupt by said I/O device and transmitted via said fabric to said server.

13. A method of sharing storage among a plurality of servers and a plurality of storage peripherals where the peripherals and the servers are nodes in a fabric of interconnected nodes, comprising:

sending a message from a server to a peripheral describing desired peripheral information and the physical address on the server for said desired information;

issuing a load/store transaction to a Remote Bus Personality Portion on the peripheral for said desired information specified in the message;

packetizing said desired information for creating one or more packets containing said desired information;

creating a routing header for said server;

prepending said routing header to said one or more packets of desired information to create routing frames each capable of being routed to the server using only information in the fabric routing header thereof;

transmitting the routing frames into the fabric and delivering them to said server;

unpacking the payload portion of the routing frames, wherein unpacking the payload portion includes removing the routing headers and posting the payload portion as a load/store transaction in the server thereby resulting in the load/store transaction being transported across the fabric from the peripheral to the server.

14. The method of claim 13, wherein said peripheral is a SATA controller.

15. The method of claim 13, wherein said message contains a description of the read address and the physical address in the server.

16. The method of claim 13, said transmitting includes using a DMA engine to initiate a DMA transfer over the fabric from the peripheral to the server.

\* \* \* \* \*